L. H. BERGER.
SURVEYING INSTRUMENT.
APPLICATION FILED JAN. 24, 1916.
1,209,107.
Patented Dec. 19, 1916.
5 SHEETS—SHEET 5.
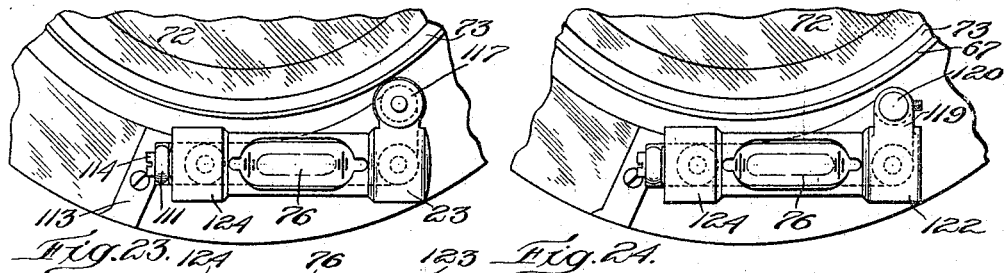
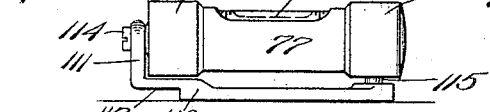
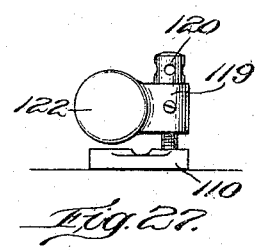
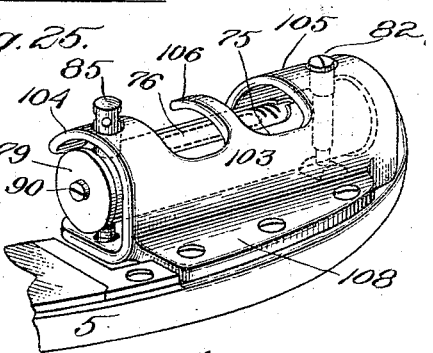
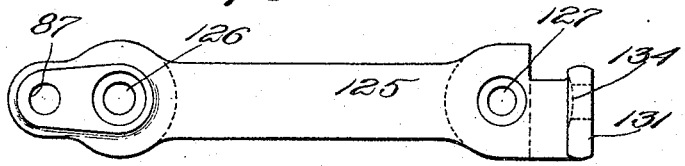
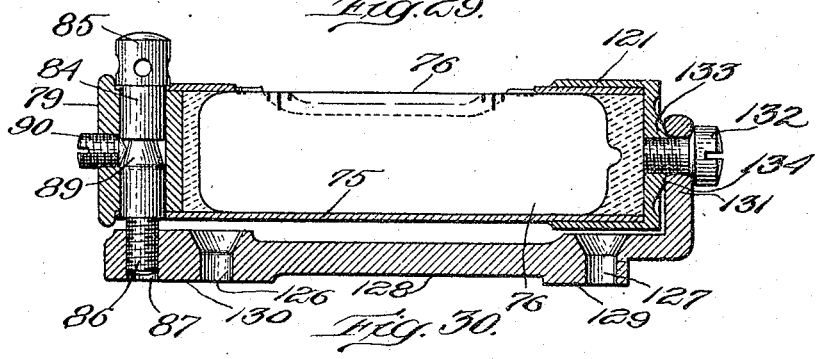
Inventor:
Louis H. Berger,
by Geo. H. Maxwell
Atty.

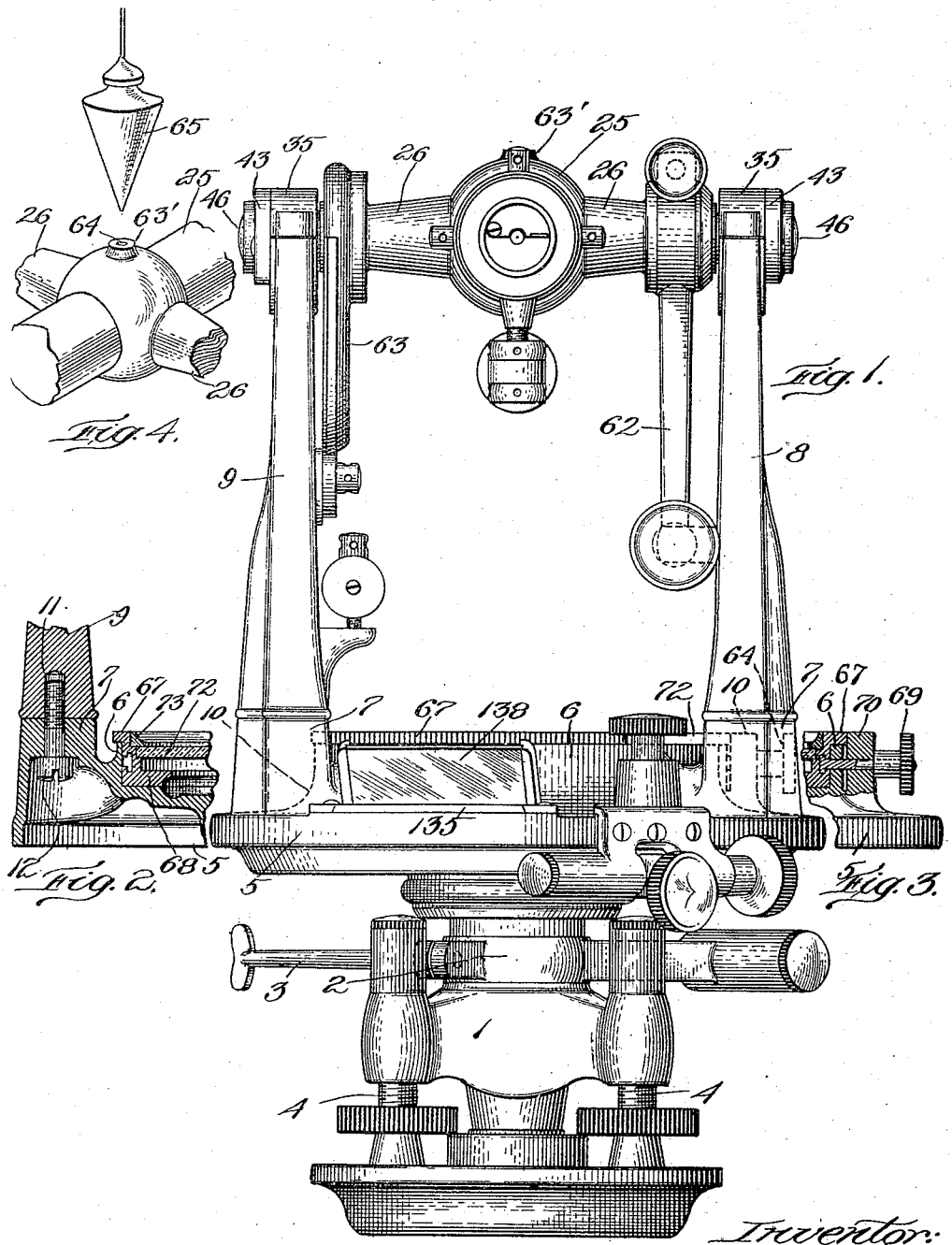

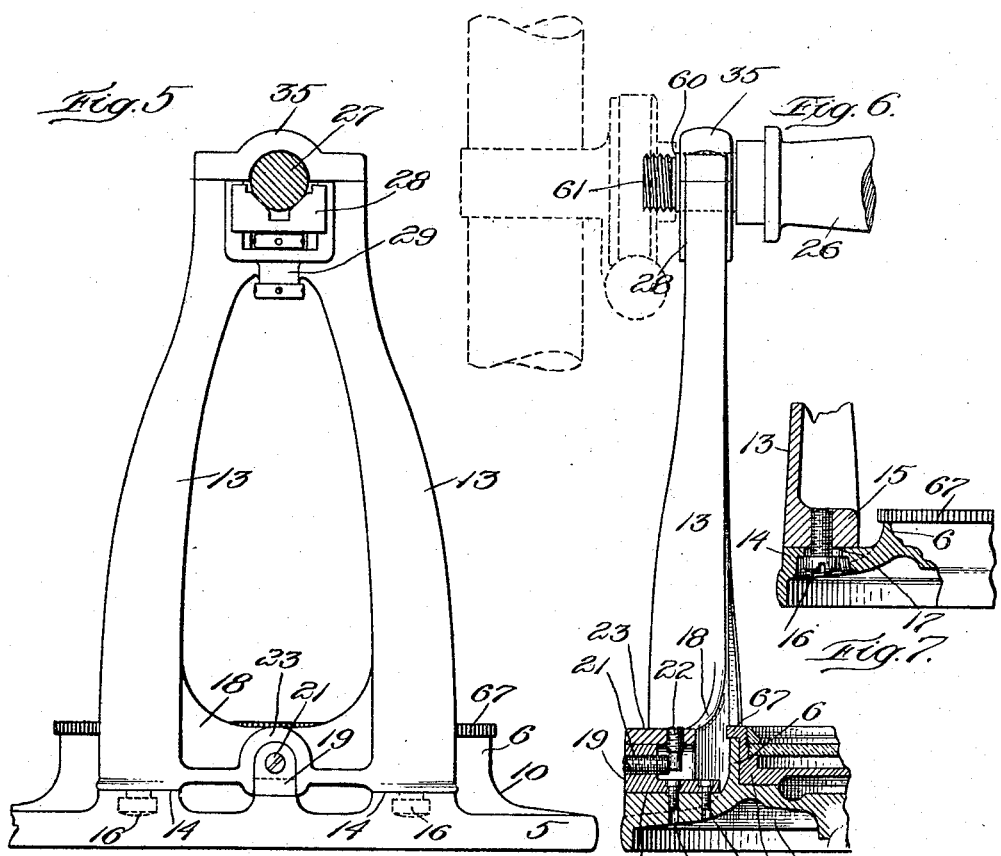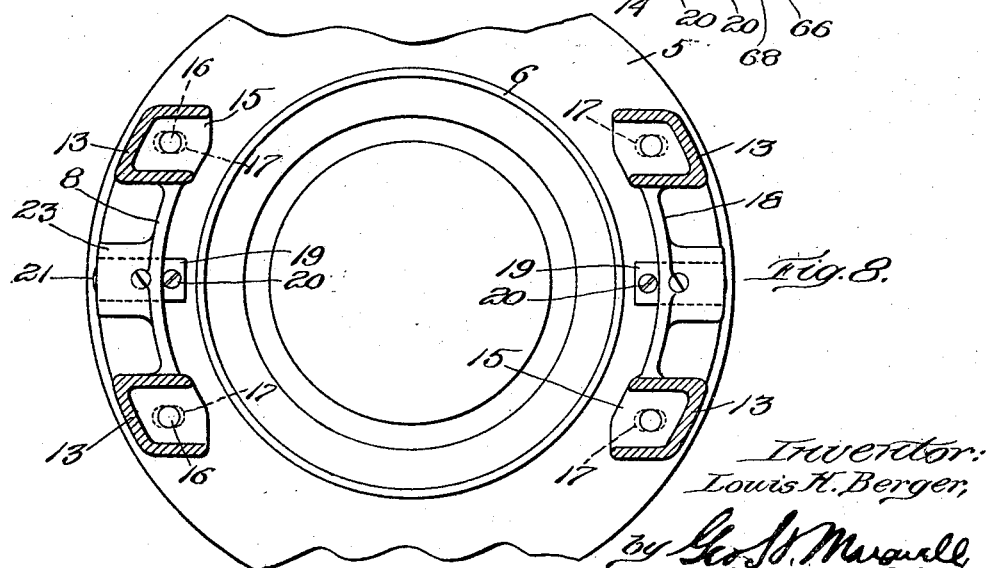

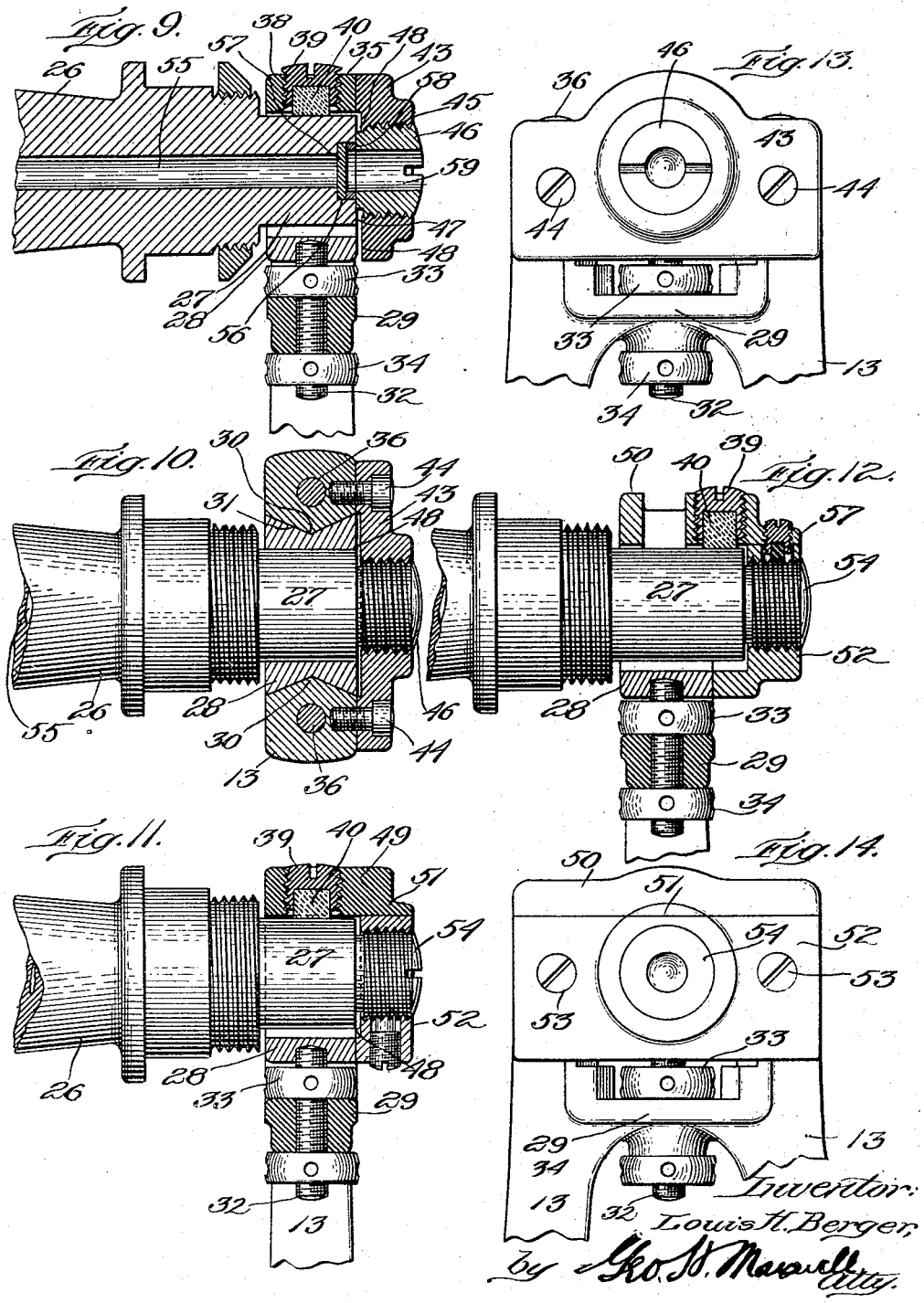

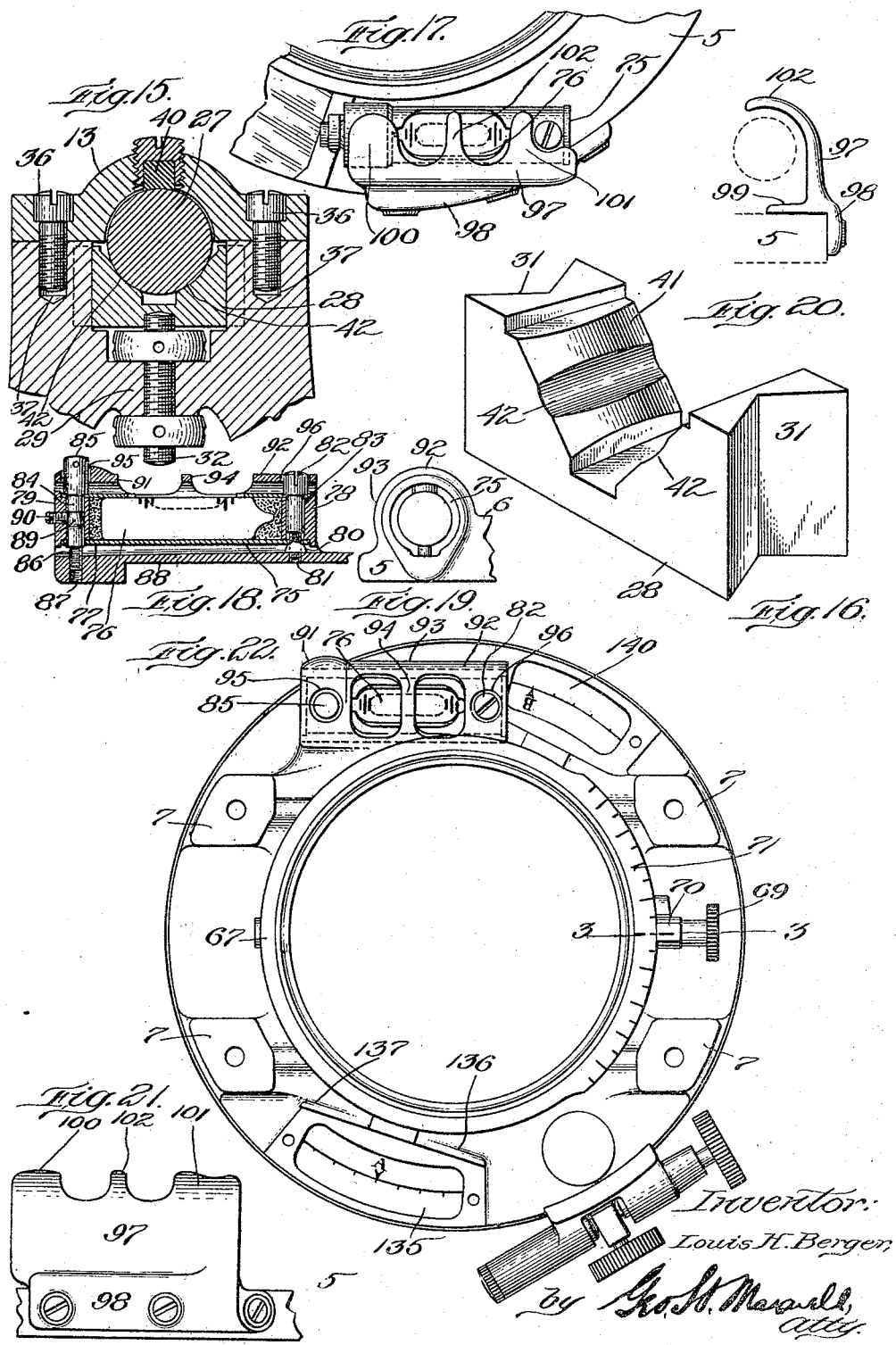

UNITED STATES PATENT OFFICE.

LOUIS H. BERGER, OF BOSTON, MASSACHUSETTS.

SURVEYING INSTRUMENT.

1,209,107.	Specification of Letters Patent.	Patented Dec. 19, 1916.

Application filed January 24, 1916. Serial No. 73,825.

*To all whom it may concern:*

Be it known that I, LOUIS H. BERGER, a citizen of the United States, and resident of Boston, in the county of Suffolk and State of Massachusetts, have invented an Improvement in Surveying Instruments, of which the following description, in connection with the accompanying drawings, is a specification, like letters on the drawings representing like parts.

My present invention is an improved surveyor's instrument and the object of the invention is to improve and perfect instruments of precision of the transit type.

Among the especial objects are to provide a surveyor's transit of specially compact form, with improved bearings, adjustments, and of a rounded contour wherever possible to receive a finishing coating and also to combine great strength which will withstand rough treatment and yet enable adjustments for truing the instrument to be readily effected.

It is a particular feature in the present improved surveyor's transit to insure strength and ready adjustments in the telescope supports, both on the bearings for the telescope trunnions and on the supporting standards, also to provide a hollowed construction to save weight, but with reinforcing and strengthening ribs to secure strength both in the standards and in the plate carrying the same.

Further important features consist in improved watershedding devices, elimination of shadows on vernier windows, novel arrangement of front and rear verniers, whereby errors are rendered practically impossible, novel supporting and adjusting devices for the plate level permitting an extra long level vial to be employed without interfering with the vernier windows, swing of the telescope, or other parts of the transit and yet keeping the level substantially within the circumference of the plate for protection and compactness.

A further feature is the arrangement of a guard for the plate level, which guard is entirely separate and independent from the level supporting and adjusting devices, so that a blow upon or injury to the guard will not disturb the level itself.

Other novel features consist in the sight arrangement through the axis of the telescope, connections between the telescope trunnions and supporting standards, provision of centering point on telescope, and improved dust guard and eye-piece cap.

Other important details of construction, advantages, and novel combinations will be hereinafter more fully pointed out and claimed.

Referring to the drawings illustrating preferred embodiments of my invention: Figure 1 is an end view of a telescope, the supporting standards, plate and leveling head of my surveyor's instrument; Figs. 2 and 3 are cross sectional views of details in the adjustments between the standards and the plate carrying them; and the locking of the variation ring, respectively; Fig. 4 is a view in perspective of the center boss on the telescope axis; Fig. 5 is a side view of the standards; Fig. 6 being a view partly in cross section of a standard and its connections on the plate; Fig. 7 being a fragmentary view of the same. The construction shown in Figs. 6 and 7 being a modification of that shown in Fig. 2; Fig. 8 is a plan view of the plate, compass ring and standard supports on the plate; Figs. 9, 10, 11 and 12 are enlarged detailed views, partly in cross section, of different arrangements of the bearings for the telescope trunnions and supporting standards; Figs. 13 and 14 being side views corresponding thereto; Fig. 15 is a cross sectional view through the supporting slide and bearing for the telescope trunnion; Fig. 16 being an enlarged view in perspective of the supporting slide; Fig. 17 is a plan view of a portion of the plate with one form of plate level and guard; Fig. 18 being a cross sectional view longitudinally of the same; Fig. 19 being one end view, and Fig. 20 the opposite end view of the level guard shown in Figs. 17 and 18; Fig. 21 is a side view of the guard shown in Figs. 17 and 18; Fig. 22 is a plan view of the plate level and front and rear verniers, together with a modified form of plate level and guard; Figs. 23 and 24 showing still further modifications of the plate level supporting devices; Figs. 25, 26 and 27 showing respectively side and each end views of the level support arrangements; Fig. 28 being a perspective view of a still further modification in the plate level guard and level support; Fig. 29 is an enlarged plan view and Fig. 30 a cross sectional view of another modification of level support and adjustment.

I have herein illustrated the various features of the invention in connection with a surveyor's transit of standard type, to which my present invention is especially applicable, although many of the advantageous features of construction could be utilized in other instruments of precision. Therefore the attached drawings are to be considered as illustrative of the novel arrangements and combinations to be described.

As shown in Fig. 1 I have illustrated a well-known type of leveling head designated generally at 1, with a tangent bracket 2, clamping screw 3 and leveling screws 4, the rotatable plate 5 being pivotally mounted within the leveling head in any suitable manner, preferably as shown in the prior patent of C. L. Berger, No. 1,125,929, dated January 26, 1915. The plate 5 is of special form, being made with a lightened hollow construction wherever possible (see Fig. 2), yet with strengthening ribs where necessary and the compass ring 6 also acting as a strength-imparting rib around the plate and especially constituting a bracing and supporting means for the bosses 7 constituting the base portion of each pair of standards 8 and 9. I also prefer to unite the compass ring 6 with the plate 5 by a rounded strengthening and quick watershedding form, as illustrated at 10. The standards 8 and 9 may also be formed hollowed with the base portions solid to receive tapped holes 11 in which bolts 12 are threaded, substantially as illustrated in the copending application of William A. Berger, Serial No. 820,276, filed February 21, 1914. This construction permits quick and ready truing up of the standards and also gives great strength. A modified form is illustrated in Figs. 5, 6, 7 and 8, wherein the standards are provided with the adjustable feature. The pair of standards 13, for example, are seated upon leveled portions 14, 14, formed on the plate 5 with the lower portions 15 solid to receive the headed bolt 16, which bolt fits through a slot 17 somewhat wider than the shank of the bolt 16 (see Figs. 7 and 8) to permit of lateral shifting or adjustment of the standards on their surfaces 14, which surface is of sufficiently greater area than that of the lower part of the standards 13 to permit of this adjustment. In order to accurately determine such sliding adjustment as between the standards and their supporting portions, I prefer to affix to the web 18 uniting the lower portions of each pair of standards 13, an adjusting and locking device, as shown in Figs. 5, 6 and 8. Midway between each pair of standards I affix a block 19 united to the plate 5 by screws 20, 20, and carrying a transverse adjusting screw 21, adapted to bear against a vertically extending screw 22 in a boss 23 formed on the central part of the web 18. Loosening of the locking bolts 16 and adjustment of the screw 21 will act to slide a pair of standards 13, 13 on the base portions 14 and effect a relative adjustment, the length of the slot 17 permitting the same. When in desired position, tightening of the bolts 16 will hold the standards and plate 5 in rigid position.

The mountings of the telescope in the standards are of novel form and several modifications are herein illustrated. The telescope barrel 25 is provided with the usual trunnions 26 which extend at either side into trued axle hubs 27, which hubs are supported in a slide 28. The top portions of each pair of supporting standards are united in the usual manner and formed, as clearly shown in Figs. 13, 14 and 15, with a horizontal part 29, and a vertical rib 30 on either side to act as a slide for the correspondingly grooved part 31 of the slide 28. To move this slide in vertical alinement a threaded stem 32 is tapped into the lowermost part of the slide 28 and passes through a suitable enlarged hole in the portion 29 at the top of each pair of standards receiving at top and bottom of the portion 29 capstan screws 33 and 34. A cap 35 spans the top part of each axle hub 27 being united to the tops of the standards by bolts 36 extending into suitable tapped recesses 37 in said standards. I prefer to make these caps of slightly larger diameter than that of the hubs 27 over which they are adapted to fit, so that the hubs will not contact therewith even when the slide 28 is moved to its extreme uppermost limit. In the center of each cap I bore a threaded hole 38 to receive a screw 39 having a recess in its lower portion to contain a non-metallic bearing block 40 which is seated directly upon the axle 27. This block or washer 40 may be of any desired fibrous material, as leather, wood, vulcanized fiber, cloth or other suitable packing material. Adjustment of the screw 39 forces the bearing block 40 into firm seating engagement on the axle and holds the same yieldingly, yet solidly, on the sliding block 28. Heretofore it has been deemed advisable to have the bearing portions of the slide 28 rounded to permit only a single line or point of contact with the hubs 27, as indicated at 41, Fig. 20. This afforded a rocker bearing between the hub 27 and the supporting faces of the sliding block 28. I prefer to groove out a seat 42 across these arcuate surfaces 41, grinding the same true to provide a relatively long seating of the hub portions 27 therein. This construction enables me to so form the standards, telescope trunnions and base-plate 5 with a view to a truss-like formation throughout, imparting great rigidity to the entire superstructure of the instrument and furthermore insures great accuracy in the collimation of the instrument. Furthermore I secure the lateral adjustment of the telescope and its hubs 27 in the supporting bearings by adjustment of threaded ends on the outermost surface of each pair of standards. This relieves all binding between the inner shoulders on each trunnion and the inner surface of the supporting standards, and transfers the strain of the lateral adjustment of the telescope to the outer surfaces of each pair of standards. This construction may be effected in a plurality of ways.

As shown in Figs. 9 and 13, for example, a side cap 43 may be attached to the top of each pair of supporting standards by screws 44, 44, which is threaded at 45 to receive a correspondingly threaded plug 46 adapted to bear upon the end 47 of the axle. With this construction at each end of the telescope trunnions, manipulation of the opposite plugs 46 will serve to adjust, transversely, the telescope, the strain of this lateral adjustment being on the outer surface of each supporting standard, which is feasible, owing to the great strength and truss-like rigidity of the entire structure, as already explained. By having this stress in the form of an endwise thrust on the telescope axles with the freedom of movement and self-seating effect secured by the weight of the telescope itself and by the downward pressure of the plugs 40 an entire absence of all binding action is insured and the accurate alinement or collimation of the instrument is maintained with greater accuracy than has been possible heretofore.

As clearly illustrated in Fig. 9 the inner part of the trunnion 26, which has its endmost portion reduced to form the axle 27, has no contacting bearing whatever against the block 28 or any part of the supporting standard, all thrust or binding action being between the plug 46 and the axle end 47, where, also, the friction due to rotation of the telescope is reduced to a minimum. To this end, also, I prefer to recess, slightly, the inner part of the side cap 43, as shown at 48, to insure the plug 46 only, bearing against the end of the trunnion 27. In Figs. 11 and 12 a somewhat modified form of top and end caps are shown, wherein the top cap 49 in Fig. 11 and 50 in Fig. 12 has an extending hub portion 51 to constitute a rounding or finishing feature on the side cap 52, which side cap is secured by screws 53, 53 in the manner already described and carries the central bearing plug 54 to impart end thrust and lateral adjustment on the telescope trunnions. One of the important features and advantages of this construction of top and end caps consists in the protection afforded to the axle bearings. This construction of caps insures a substantially waterproof and dust-proof covering for the axle bearings, which is a most important and desirable point in instruments of this class.

A further feature in my present instrument is the provision of a transverse sight means through the trunnions of the telescope, the supporting axles, the bearing connections, and the end thrust plugs at either side. It is often desirable to secure an accurate, quick sighting of a surveyor's instrument transversely of the line of sight without rotating the plate 5 and to this end I provide a bored recess 55 entirely through each trunnion 26, counter boring at 56 each axle end and fitting therein a glass window 57 to keep out the dust. A washer ring 58 is sprung into the counterbored recess 56 to hold the window 57 in place. A corresponding central recess 59 through the center of the thrusting plug 46 and in alinement with the trunnion bores 55 enables a line of sight transversely of the telescope to be obtained. Furthermore these central bores 55 in the trunnion and 59 in the thrusting plug reduce the friction of the end thrust, leaving the thrust bearing on the comparatively small frictional surface between the outer periphery of the plug 46 and the adjacent surface of the axle end 47.

When it is desired to provide the instrument with a vertical telescope, as in mine work, one side trunnion will extend beyond the axle portion 27 and the bearings therefor, projecting outwardly (see Fig. 6) sufficiently to provide a threaded support for the vertical telescope to be applied thereto, the end thrust in such cases being taken up by a washer 60, bearing against the outer side of the bearing block 28 and leaving the projecting part 61 of the trunnion extending beyond said washer.

As illustrated in Fig. 1, the telescope trunnions are provided with the usual adjusting and locking arms 62 and angle quadrant 63, but as these form no part of my present invention they are not herein more fully described.

In many lines of work it has been found difficult to carefully line the telescope under a plumb bob, and to facilitate accuracy in this line of work I provide novel means on the telescope barrel, consisting in a boss 63ª with a central recess 64, preferably of contrasted color from the exterior finish, directly on the ball of the telescope axis, forming a centering point for alinement with the plumb bob 65, as clearly shown in Fig. 4. This feature is especially important in underground work, when centering from a point above instead of from below.

The plate 5, when formed with the compass rim 6 and bosses 7, as shown in Figs. 1, 2 and 22 constituting, in effect, a strengthening rib across the plate from one pair of standards to the other, imparts suitable rigidity thereto. In the form of plate and standard connections shown in Figs. 5, 6, 7 and 8, however, it may be desirable to apply transverse strengthening ribs underneath the plate 5, as indicated at 66. The plate 5, is of rounded exterior contour wherever possible, and the compass rim 6 is preferably protected by the overhanging and projecting rim 67 of the variation ring 68, which ring is locked in adjusted position by a thumb nut 69 (see Fig. 3) threaded through an upstanding lug 70 at one side of the compass rim 6, passing loosely through the compass rim and locking the outer surface of the variation ring 68 to the sloping exterior of the compass rim 6 by a pulling clamp. This construction brings the locking tension entirely on the lug 70 and frees the compass rim 6 of any strain or distortion. Because of the slight slot or recess (see Fig. 3) between the lug 70 and the compass rim 6, I prefer to form the rim 67 of the variation ring slightly enlarged, as indicated at 71, Fig. 22, for a sufficient length to insure the limit of movement necessary or desirable in the variation ring, namely 65° east and 65° west from the line denoting zero at index mark which portion 67 will maintain a sliding contact with the lug 70 and be flush with the top thereof. The remaining portion of the ring 67 may be knurled, as clearly shown in Figs. 1 and 5 to facilitate manipulation by the hand of the operator without the use of tools such as adjusting pins and the like. A glass 72 is fitted within the compass rim and held by ring 73 in the usual manner, the whole compass box being detachable from the horizontal plate holding the standards.

The plate level is formed, supported and adjusted in a novel manner, it being an important feature of the present invention to enable a relatively long vial to be affixed, while keeping the same within the limit of the periphery of the plate, and also to insure against any binding action through the adjustments for mounting the level. Furthermore, the guard for the plate level is made and mounted entirely independently of the level itself or its supports. Owing to the somewhat exposed position of a plate level on a surveying instrument, it is subject to accident, and frequently hard blows are received. In my present construction I mount the guard for the plate level in a firm, rigid and protecting manner and yet entirely free from contact with the level supports or adjustments, so that all blows, accidental distortion or the like received by the guard, will transmit no effect or injury to the level itself.

I have illustrated several modifications of plate level mounting and guard. Referring to Figs. 18, 19 and 22 the plate level comprises the cylindrical barrel 75 containing the level vial 76 and packing 77 at either end. At each end of the barrel 75 is a filling plug 78 and 79 respectively to receive the supporting and adjusting screws. At one end, for example the right, viewing Fig. 18, is a rocker support 80, having an enlarged perforation therethrough to receive the threaded stem 81 of the extended part of a screw 82 adapted to pass through a bored recess in the filling plug 78 of appropriate diameter to closely fit the smooth shank portion 83 of said screw. If the part 81 of the stem extends below the rocker 80 a suitable recess of greater diameter than said stem is provided to permit the entire vial and screw 82 to rock on the support 80 without binding. At the opposite end of the level the filling plug 79 is similarly bored to receive the shank 84 of a screw 85, which screw has a threaded portion 86 extending downwardly and engaging a correspondingly tapped recess 87 below the vial, either directly in the surface of the plate 5 or in a separate supporting plate 88, which may be attached to the plate 5. The shank 84 is preferably beveled as indicated at 89 and a conical screw 90 is threaded through the central portion of the filling portion 79 to engage said conical portion 89 and hold the level supported on the screw 85 from this central bearing in the position of its axis. Adjustment of the screw 85 raises and lowers this end of the level until the correct position is attained, the other end of the level rocking freely upon the support 80. Suitable guards for this level are shown in Figs. 22 and 28 and also partly in cross section in Fig. 18. The guard shown in Fig. 22 is formed integrally with the plate 5 or is formed separately secured to said plate and unified therewith in the finishing enamel applied to the instrument. This type of guard comprises a circular protecting portion 91, at one end, 92 at the other end, united on the sides by the main portion of the guard 93 and with a central rib 94 extending entirely across the opening through which the vial is visible. As the adjusting screws 82 and 85 should be accessible with the guard in place, suitable apertures, larger than the heads of said screws, through the portions 91 and 92, are made as shown at 95 and 96 respectively, Figs. 18 and 22. Thus the entire guard member rigidly formed with or secured to the plate 5 incloses and protects the plate level without being in actual contact therewith at any point and yet permits freedom of adjustment of the plate level with the protecting confines of the guard. A different form of guard is shown in Figs. 17, 20 and 21, wherein the guard proper, 97, is formed to be partially secured to the face of the plate 5 and partially to the rim or edge. This guard has a flange portion 98 adapted to fit upon the edge of the plate 5 and a horizontal portion 99 fitting over the face of the plate 5 and of suitable curved contour to fit snugly in position. This type of guard may have its end portions 100 and 101 and the central protecting prong 102 extended only partly over the level and of appropriate contour to avoid the adjusting screws at either end of the level. This form of guard gives great strength to withstand blows or shocks, the flange constructions 98 and 99 insuring rigidity to withstand injury. These guards may be made of any suitable metal, aluminum, bronze, or the like.

In Fig. 28 a still further modification of guard 103 is illustrated with the protecting portions 104 and 105 at either end apertured to receive the projecting ends of the adjusting screws for the plate level and the central guard 106 being curved to extend around and down over the vial. The central guard in each instance is further useful as a centering gage to determine when the vial is level. In this form a part of the guard 103 may extend entirely under the level, as indicated at 107, while an outwardly extending flange 108 flush with the edge of the plate 5 is secured thereto by a plurality of screws.

I prefer to mount the plate level on an independent support, which support is secured directly to the plate 5, as already mentioned in connection with the form of level shown in Fig. 18. It is most desirable to have this plate level within the periphery of the circumference of the plate 5, as previously noted, to prevent injury thereto, and by mounting the level on a separate support I can place the plate level with its separate support in a more compact and advantageous position about the plate, especially with reference to the vernier windows, supporting standards, lifter levers and the like, than would be otherwise possible. A type of support is shown in Fig. 25, wherein the support itself 110 has an extending arm 111 at one end with a notched portion 112 to adapt the support to fit over the vernier window strap 113, shown in Fig. 23. A central screw 114 through the arm 111 will serve to hold the adjacent end of the level in a substantially axial position, as will be explained. The opposite end of the level, shown in Figs. 23, 25 and 26, may be supported by a post 115, offset at one side of the level, as illustrated in Fig. 26, a projecting ear 116 being raised or lowered by engaging capstan screws 117 and 118 above and below respectively and each threaded on the post 115.

In Figs. 24 and 27 a similar offset support for one end of the level is shown, comprising a lug 119 with a capstan screw 120, similar in construction to that designated as 85 and already described in connection with the level shown in Fig. 18, and in enlarged detail on Fig. 30. Instead of the filling pieces for the vial cylinders, I prefer to fit, on the cylinder 25, a cap inclosing the cylinder, such as clearly shown at 121, Fig. 30, similar caps 122, 123 and 124 being employed in the levels illustrated in Figs. 25, 26 and 27. The separate support 125 shown in enlarged form in Figs. 29 and 30, is provided with countersunk apertures 126 and 127 to hold same to the plate 5, being preferably recessed along the central portion 128 to facilitate the even setting of the end parts 129 and 130 only on the plate 5. This support 125 has an upstanding arm 131 adapted to receive, loosely, the headed screw 132, which is threaded into the rounded end 133 of the cap 121. Preferably the inner surface of the arm 131 adjacent the aperture through which the screw 132 passes is concaved, as indicated at 134, to facilitate the seating of the rounded bolt 133 on the cap 121. This construction is similar to that already partially described in connection with the support 110 shown in Figs. 23 and 25. In this particular form of level support, the end cap 121 is at all times firmly seated against the arm 131, permitting a rocking of the bearing surfaces, without possibility of binding. The vertical adjustment of the opposite end of the level may thus be effected quickly and accurately, without danger of distorting the level and when locked in position will be rigidly maintained in its adjustments. The cap 121, though snugly encircling the cylinder 75, yet will admit of a sliding of said cylinder therein, thus further automatically providing for an elasticity in construction while rigidly supported.

In the present instrument I have employed an improved type of double and single opposite verniers, the A vernier 135, Fig. 22, being double and with the rear arms 136 and 137 of sufficiently raised and inclined form to act as a watershed, preventing the flow of rain or water from the instrument across the glass window of the vernier, which would obscure it. The vernier shade 138 is also carried up in alinement with the arms 136 and 137 to still further protect the window of the vernier and constitute an effective watershed therefor. The rear or B vernier 140 is preferably single, for reading angles only in conjunction with the clockwise row and left hand A vernier, for use in triangulation.

The advantages of the various novel features of my improved surveyor's instrument will, it is believed, be readily appreciated by surveyors and engineers. The entire instrument is capable of being made with a rounded contour to take enamel or leather finish and eliminate corners or the like where such finish is apt to be broken through; compactness and a low center of gravity throughout is obtained, and a simplicity in adjustments, truing-up capabilities, together with great rigidity and truss-like strength of the supporting standards and envelops is secured. Moreover the provision of dust-proof and rain-proof caps and guards is of great importance, particularly in underground work, and the arrangement whereby plate level, vernier windows and adjusting devices are self-contained within the periphery of the plate level and below the height of the compass ring, afford protection therefor and convenience of view, permitting the telescope to be mounted lower than theretofore, just sufficient to swing clear of the compass ring. The entire center of gravity of the instrument has been greatly lowered to the tripod head on which it is mounted, thereby gaining unusual stability without having decreased the length of the centers. A further important advantage is that the standard caps 35 may be removed or adjusted without deranging the lateral adjustment of the telescope. Also the 35 degree plate level in case of breakage can be removed without detaching the guard, both being independent of each other in supports and adjustments.

My invention is further described and defined in the form of claims as follows:

1. In a surveyor's instrument, a telescope having a transverse axle, provided with bearings near each end of the axle, supports for said bearings, adjustable end thrust devices for the ends of said axle and means to secure lateral adjustment of the telescope and its axle in said bearings by adjusting said end thrust devices.

2. In a surveyor's instrument, a telescope having a transverse axle, provided with bearings near each end of the axle, supports for said bearings, an adjustable end thrust member, bearing on an end of the axle and carried by one support, and means to secure lateral adjustment of the telescope and its axle in said bearings by said adjustable end thrust device.

3. In a surveyor's instrument, a telescope having a transverse axle provided with vertically sliding bearings near each end of the axle, supports for said bearings, an adjustable end thrust device carried by said sliding bearing during its vertical adjustments, to secure lateral adjustment of the telescope and its axle in said bearings by the adjustment of said device.

4. In a surveyor's instrument, a telescope having a transverse axle, provided with bearings near each end of the axle, supports for said bearings, and means to secure lateral adjustment of the telescope and its axle, said adjusting means comprising an end inclosing member secured to each support and constituting a dust-proof covering for the end of the axle, an adjustable plug carried by said member and having a thrust bearing on the end of the axle.

5. A surveyor's instrument, having a telescope and a horizontal axle therefor, vertically adjustable supporting bearings for the end portions of said axle, end thrust devices carried by said vertically adjustable support and adapted to bear endwise on the telescope axle, adjustment of said end thrust bearings acting to adjust, laterally, said telescope, while holding it in the position to which it has been adjusted.

6. A surveyor's instrument, having a telescope and a horizontal axle therefor, vertically adjustable supporting bearings for the end portions of said axle, a cap for each adjustable bearing extending over the top of the adjacent axle, an adjustable plug carried by each cap having a non-metallic block in its end surface and adapted to bear upon said axle.

7. A surveyor's instrument, comprising a telescope, a transverse axle therefor, end supports for said axle, said axle and end supports having a sighting opening therethrough permitting transverse sighting through said opening.

8. A surveyor's instrument, comprising a telescope, a transverse axle therefor, end supports for said axle, end thrust retaining devices carried by said supports and engaging the end portions at each end of the axle, a sighting opening entirely through said axle and its end thrust devices, and a transparent dust-guard adjacent each end of the axle opening.

9. An axle support for an instrument of precision consisting in a vertically movable supporting bearing for the axle, an inclosing cap carried by said bearing and covering the end of the axle, an end thrust plug threaded through said covering member and adapted to bear against a portion of one end of said axle, and means bearing on the other end of said axle permitting lateral adjustment of the axle by the rotation of said threaded plug.

10. An axle support for an instrument of precision consisting in a movable supporting bearing for the axle, an inclosing cap carried by said bearing and covering the end of the axle, an end thrust plug threaded through said covering member and adapted to bear against a portion of the end of said axle, a sighting opening through said axle and end thrust plug, a transparent dust guard in said sighting opening adapted to be held in position by the end thrust plug.

In testimony whereof, I have signed my name to this specification, in the presence of two subscribing witnesses.

LOUIS H. BERGER.

Witnesses:
JAMES R. HODDER,
SEBASTIAN VAUGHAN.

Copies of this patent may be obtained for five cents each, by addressing the "Commissioner of Patents, Washington, D. C."